United States Patent [19]
Thorvaldsson

[11] Patent Number: 5,969,509
[45] Date of Patent: Oct. 19, 1999

[54] METHOD AND A DEVICE FOR CONTROL OF A CAPACITOR DEVICE FOR A SHUNT-CONNECTED COMPENSATOR UNIT

[75] Inventor: Björn Thorvaldsson, Kolbäck, Sweden

[73] Assignee: Asea Brown Boveri AB, Vasteras, Sweden

[21] Appl. No.: 09/016,733

[22] Filed: Jan. 30, 1998

[30] Foreign Application Priority Data

Feb. 6, 1997 [SE] Sweden .................................. 9700521

[51] Int. Cl.⁶ .................................................. G05F 1/70
[52] U.S. Cl. ................................................... 323/210
[58] Field of Search ................................. 323/205, 208, 323/209, 210, 211, 233

[56] References Cited

U.S. PATENT DOCUMENTS

| | | | |
|---|---|---|---|
| 4,472,674 | 9/1984 | Yano et al. ............................ | 323/210 |
| 4,529,926 | 7/1985 | Takada .................................. | 323/210 |
| 4,555,658 | 11/1985 | Hausler et al. ........................ | 323/210 |
| 4,686,447 | 8/1987 | Takeda et al. ......................... | 323/210 |
| 4,752,726 | 6/1988 | Aoyama ................................ | 323/207 |
| 4,755,738 | 7/1988 | Shimamura et al. .................. | 323/210 |
| 4,771,225 | 9/1988 | Nishikawa ............................ | 323/21 |
| 4,857,821 | 8/1989 | Takeda .................................. | 323/210 |
| 5,099,190 | 3/1992 | Sato ....................................... | 323/210 |
| 5,124,628 | 6/1992 | Ogiwara ................................ | 323/211 |
| 5,198,746 | 3/1993 | Gyugyi et al. ........................ | 323/207 |
| 5,402,058 | 3/1995 | Larsen .................................. | 323/211 |
| 5,434,497 | 7/1995 | Larsen .................................. | 323/209 |
| 5,489,838 | 2/1996 | Leowald et al. ...................... | 323/210 |
| 5,627,454 | 5/1997 | Aebischer et al. .................... | 323/210 |
| 5,631,545 | 5/1997 | Norman et al. ....................... | 323/205 |

FOREIGN PATENT DOCUMENTS

| | | |
|---|---|---|
| 0 298 515 A1 | 1/1989 | European Pat. Off. . |
| 0 373 601 A2 | 6/1990 | European Pat. Off. . |

OTHER PUBLICATIONS

Reichert, Controllable reactive compensation, Electrical Power & Energy Systems, vol. 4, No. 1, 1982, pp. 51–61, Butterworth & Co. (Publishers) Ltd.

Ekström, HVDC and SVC, High Power Electronics, The Royal Institute of Technology, High Power Electronics, EKC–Electric Power Research Center, pp. 10–1–10–7, Jun. 1990.

*Primary Examiner*—Adolf Deneke Berhane
*Attorney, Agent, or Firm*—Pollock, Vande Sande & Amernick

[57] ABSTRACT

A device for control of a capacitor device for a shunt-connected static compensator unit (COM1, COM2, COM3) for compensation of reactive power in an electric power network (NW). The capacitor device comprises a capacitor and a semiconductor valve, connected in series with said capacitor, with a first semiconductor, corresponding to respectively a first and a second conduction direction for current through the capacitor. The device comprises members (VN, FSD, CU) which, in dependence on a voltage (Uab, Ubc, Uca) sensed at the compensator, alternately generate a firing order for the respective semiconductor. In addition thereto, the device comprises members which, for each of the first and second conduction directions, form a deblocking signal, indicating that the conduction direction associated with the respective firing order does not carry current, and which thus generate a firing order for the second of the first and second conduction directions with an optional delay (T1*f*360°) after the occurrence of said deblocking signal.

10 Claims, 6 Drawing Sheets

METHOD AND A DEVICE FOR CONTROL OF A CAPACITOR DEVICE FOR A SHUNT-CONNECTED COMPENSATOR UNIT

TECHNICAL FIELD

The present invention relates to a method for control of a capacitor device for a shunt-connected compensator unit for compensation of reactive power in an electric power network, and to a device for carrying out the method.

BACKGROUND ART

It is known to connect to electric power networks static compensators, in shunt connection, for compensation of the power network and the reactive power consumption of equipment connected to the power network. One type of such compensators comprises at least one, and usually a plurality of, thyristor-switched capacitors. A thyristor-switched capacitor comprises essentially a capacitor in series connection with a controllable semiconductor. In addition thereto, usually an inductive element, an inductor, is arranged in series connection with the capacitor to limit the rate of change of the current through the capacitor at its connection to the power network and to avoid resonance phenomena with inductive components present in the power network. Such a thyristor-switched capacitor will hereinafter be referred to as a capacitor device and for a three-phase power network a compensator unit comprises three such capacitor devices, usually in Δ-connection.

The controllable semiconductor valve comprises two controllable semiconductors, usually thyristors, in anti-parallel connection. By connecting the semiconductors, that is, by controlling their firing times relative to the phase position of the voltage of the ac network, the capacitor may be connected to the power network for generating reactive power. It is to be understood that, in this application, the concept capacitor also comprises those cases where the capacitor is composed of a plurality of interconnected capacitive elements, sub-capacitors, which are all commonly connected by the controllable semiconductor valve. Further, it is to be understood that, in this application, the concept semiconductor also comprises those cases when each one of the controllable semiconductors of the semiconductor valve is composed of a plurality of mutually series-connected thyristors, which are all commonly controlled by a firing order. A control device thus generates individual firing pulses for the semiconductors included in the semiconductor valve.

A compensator of the kind described above usually comprises a number of compensator units, the switching-in of which is controlled by a superordinate voltage control system which, in dependence on a sensed voltage in the power network and a reference value for this voltage, generates switching-in orders for switching in the respective compensator unit.

For a general description of thyristor-switched capacitors and control thereof, reference is made to, for example, Åke Ekström: High Power Electronics HVDC and SVC, Stockholm 1990, in particular pages 10-1 to 10-7, and to K. Reichert: Controllable reactive compensation. Electric Power & Energy Systems, Vol. 4, No. 1, January 1982, pages 51–61.

In the following, the term fundamental component for a voltage or a current in an electric power network means that component of the respective voltage or current which is of a frequency corresponding to the frequency of the power network; for example, a power network with the nominal frequency of 50 Hz has a frequency of, or at least near, 50 Hz.

Since the current through the thyristor-switched capacitor stationarily has a phase position of 90 electrical degrees before the voltage across the same, the two semiconductors of the semiconductor valve should be given firing orders alternately and at the times when the time rate of change of the fundamental tone of the voltage across the thyristor-switched capacitor changes signs from a positive value to a negative value and inversely. If the phase position of the voltage is defined such that its amplitude is zero at 0° and increasing in a positive direction, under stationary conditions these sign reversals take place at the electrical angles 90° and 270°. When the above-mentioned time rate of change changes signs from a positive to a negative value, a firing order should be given to that of the semiconductors, the conduction direction of which coincides with the expected current direction in the interval to follow, that is, with the above-mentioned convention, in the interval of 90° to 270°. This conduction direction will be referred to hereinafter as the expected current-carrying conduction direction for the interval in question. When the mentioned time rate of change again changes signs, a firing order is given to the other semiconductor, the conduction direction of which coincides with the expected current direction in the interval which is then to follow, that is, with the above-mentioned convention, in the interval of 270° to 450°.

When the generation of a firing order is caused to cease, for example in dependence on the voltage control system, the current through the semiconductor valve will cease at the next zero crossing of the current. The voltage of the capacitor thus remains at a level determined by the voltage of the power network when the current through the capacitor is brought to cease. When a firing order is again generated, according to the criterion mentioned above, and the voltage of the power network has remained unchanged, the switching-in of the capacitor takes place, in principle, without any transient phenomena in current and voltage.

When switching in the capacitor in those cases where a voltage difference exists between the voltage of the power network and the voltage across the capacitor, however, harmonic oscillations are initiated, which may entail abnormally high currents through the semiconductor and the capacitor. These oscillations influence currents and voltages at the point of connection of the compensator to the power network, and this influence may be regarded as a deterioration of the electrical quality of the power network.

A known phenomenon in connection with thyristor-switched capacitors is that a misfiring of a semiconductor at a time when the voltage across the capacitor has reversed polarity in relation to the voltage of the power network, because the current through the capacitor then grows very rapidly, leads to an increase in voltage which is harmful to the capacitor, and to abnormally high currents for the semiconductor.

A known way of generating a firing order is to continuously apply a firing order to both semiconductors when a switching-in order occurs and when a first firing order has been formed in accordance with the above-mentioned criterion. In that way, both conduction directions of the semiconductor valve are kept open for the current through the capacitor and the risk of misfirings is eliminated.

However, studies have shown that the above-mentioned harmonic oscillations when switching in the capacitor, when a voltage difference exists between the voltage of the power network and the capacitor, are damped very slightly, so the change of state to undisturbed operation becomes very long.

Also for those cases when the voltage of the power network contains harmonics, a resonance state may occur with detrimentally high currents for the thyristor-switched capacitor.

Another known way of generating a firing order is, at the beginning of each of the above-mentioned intervals of 180°, that is, at the times when the time rate of change of the voltage of the power network changes signs, from a positive to a negative value or inversely, to give a firing order only to that semiconductor, the conduction direction of which coincides with the expected current direction in the following interval. A firing order for the two semiconductors is thus generated alternately and for that semiconductor, the conduction direction of which coincides with the expected current-carrying conduction direction during the interval. A phase-locked loop forms, in dependence on the voltage of the power network, a sinusoidal signal such that it corresponds to the fundamental component of the voltage across the capacitor device and is phase-locked 90 electrical degrees before that voltage. This sinusoidal signal thus constitutes the time rate of change of a value of the fundamental component of the voltage across the capacitor device, which value is derived from the voltage sensed in the power network. A firing order for the valve is generated, in principle, at, but in practice shortly before, the zero crossings of the phase-locked signal.

With the above method for generating a firing order, a good damping is achieved of the transients after a switching-in when there is a voltage difference between the power network and the capacitor, and also of the above-mentioned resonance phenomena when the voltage of the power network contains harmonics.

Under certain conditions, typically in case of rapid changes of the phase position of the voltage of the power network, caused, for example, by a fault therein, because of the transient time of the phase-locked loop, however, at least a transient situation arises where the sinusoidal signal formed by the phase-locked loop is not phase-shifted 90 electrical degrees with respect to the voltage of the power network. A consequence of this is that the current through the current-carrying semiconductor approaches zero within one of the above-mentioned intervals of 180° and is thereby caused to cease and remain zero until a firing order is generated for the reversed conduction direction. The voltage in the power network will thus be built up as an off-state voltage in the conduction direction across that semiconductor which is next to receive a firing order, which voltage, when the firing order is generated, leads to a high current through the capacitor with an ensuing risk of overvoltages thereon.

SUMMARY OF THE INVENTION

The object of the invention is to achieve an improved method of the kind described in the introductory part of the description, which, on the one hand, provides a good damping of the transient phenomena after a switching-in of the capacitor device when there is a voltage difference between the power network and the capacitor and of the above-mentioned resonance phenomena when the voltage of the power network contains harmonics, and which, on the other hand, counteracts harmful voltage increases across the capacitor, for example in case of rapid changes of the phase position for the voltage of the power network, caused by the build-up of an off-state voltage across a semiconductor.

BRIEF DESCRIPTION OF THE DRAWINGS

The invention will be described in greater detail by description of embodiments with reference to the accompanying drawings, wherein.

DESCRIPTION OF THE PREFERRED EMBODIMENTS

The following description relates both to the method and to the device.

The device comprises logic circuits and time-delay circuits, shown in the figures in the form of block diagrams, which may be completely or partially formed as analog or digital electric circuits or consist of program functions, for example in microprocessors programmed for the purpose. In this connection it is to be understood that the input and output signals to the respective circuits may consist of electrical/logic signals or of calculating values. In the following, the terms signal value and calculating value are therefore used synonymously.

In order not to burden the presentation with distinctions which are obvious to the man skilled in the art, the same designations are generally used for the currents and voltages which arise in the electric power network and in the compensator and for the measured values and signals/calculating values, corresponding to these quantities, which are supplied to and treated in the control equipment described in the following.

The block diagrams show blocks for the formation of certain calculating values, which are used in other shown blocks. Connecting lines between these blocks have in certain cases been omitted in order not to burden the drawings, but it is to be understood that the respective calculating values are obtained from the blocks in which they are formed.

Figure 1:
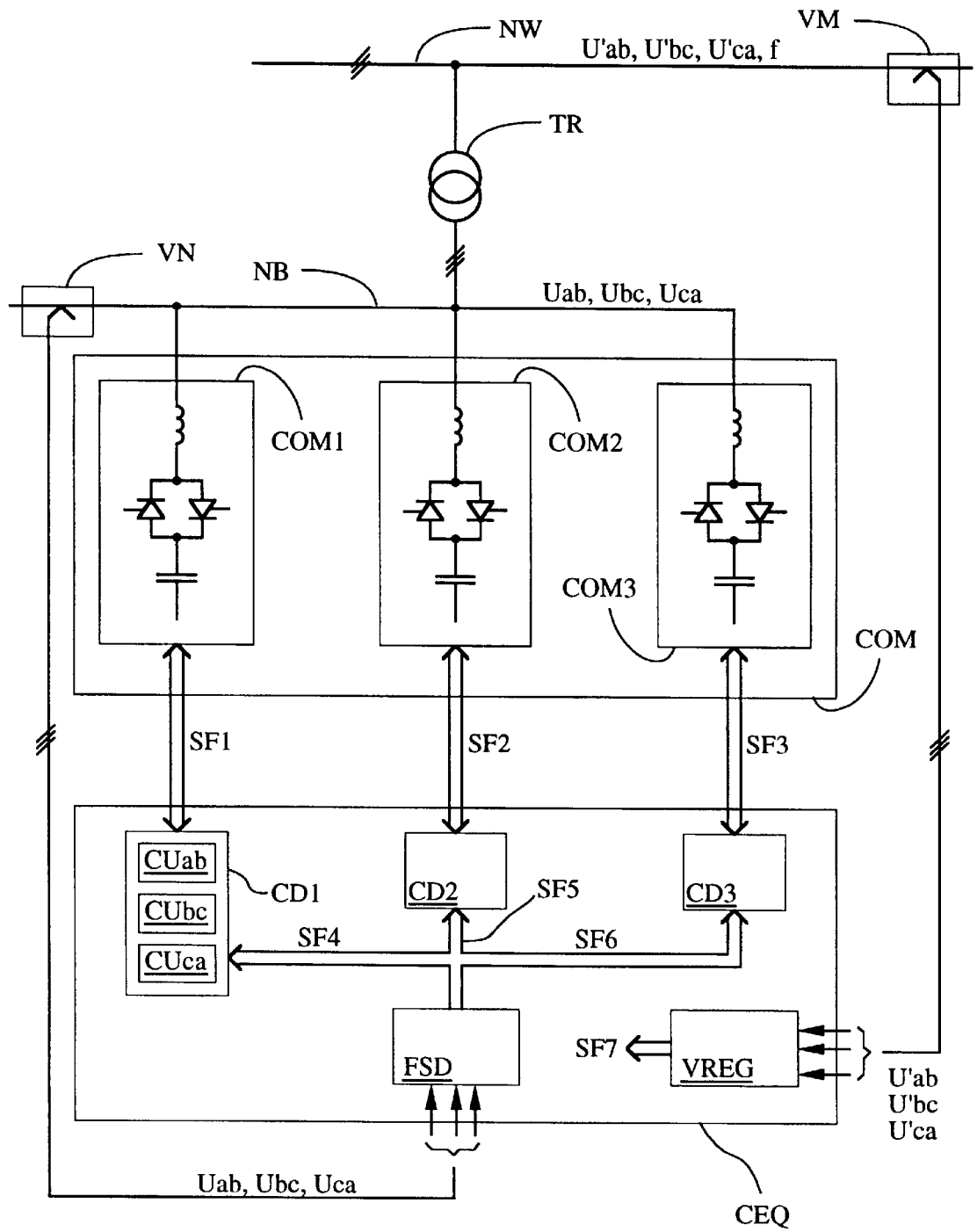
FIG. 1 shows, in the form of a single-line diagram, a compensator comprising thyristor-switched capacitors, connected to an electric power network.

FIG. 1 shows in the form of a single-line diagram a compensator COM comprising three compensator units COM1, COM2, COM3, respectively. Each one of the compensator units, which are mutually similar, comprises a capacitor device of the kind described above. The compensator is connected to the busbar NB, which via a transformer TR is connected to a three-phase electric power network NW with the frequency f Hz and with the phases a, b and c. Control equipment CEQ, which is to be described in more detail below, comprises a firing signal device FSD, a voltage control device VREG and, for each of the compensator units, a control device CD1, CD2, CD3, respectively. Each one of the control devices, which are mutually similar, comprises three control units, which are also mutually similar. The control units in the control device CD1 are designated CUab, CUbc, CUca, respectively, in the figure.

By means of a voltage-sensing device VM, the principal voltages U'ab, U'bc and U'ca in the power network NW are sensed. The corresponding measured values, formed by the voltage-sensing device, are supplied to a voltage control device VREG. By means of a voltage-sensing device VN, the principal voltages Uab, Ubc and Uca on the busbar NB are sensed. The corresponding measured values, formed by the voltage-sensing device VN, are supplied to the firing signal device FSD. The control equipment CEQ generates and supplies to the compensator control signals for the respective compensator units in dependence on the measured values mentioned.

Between the control equipment and each of the compensator units, a bidirectional flow of signals SF1, SF2, SF3, respectively, is transmitted, which flows, in principle, are of a mutually similar kind.

The firing signal device supplies to each of the control devices a signal flow SF4, SF5, SF6, respectively, which flows, in principle, are of a mutually similar kind.

The voltage control device generates a signal flow SF7. All of the signal flows mentioned will be described in greater detail below.

Figure 2:
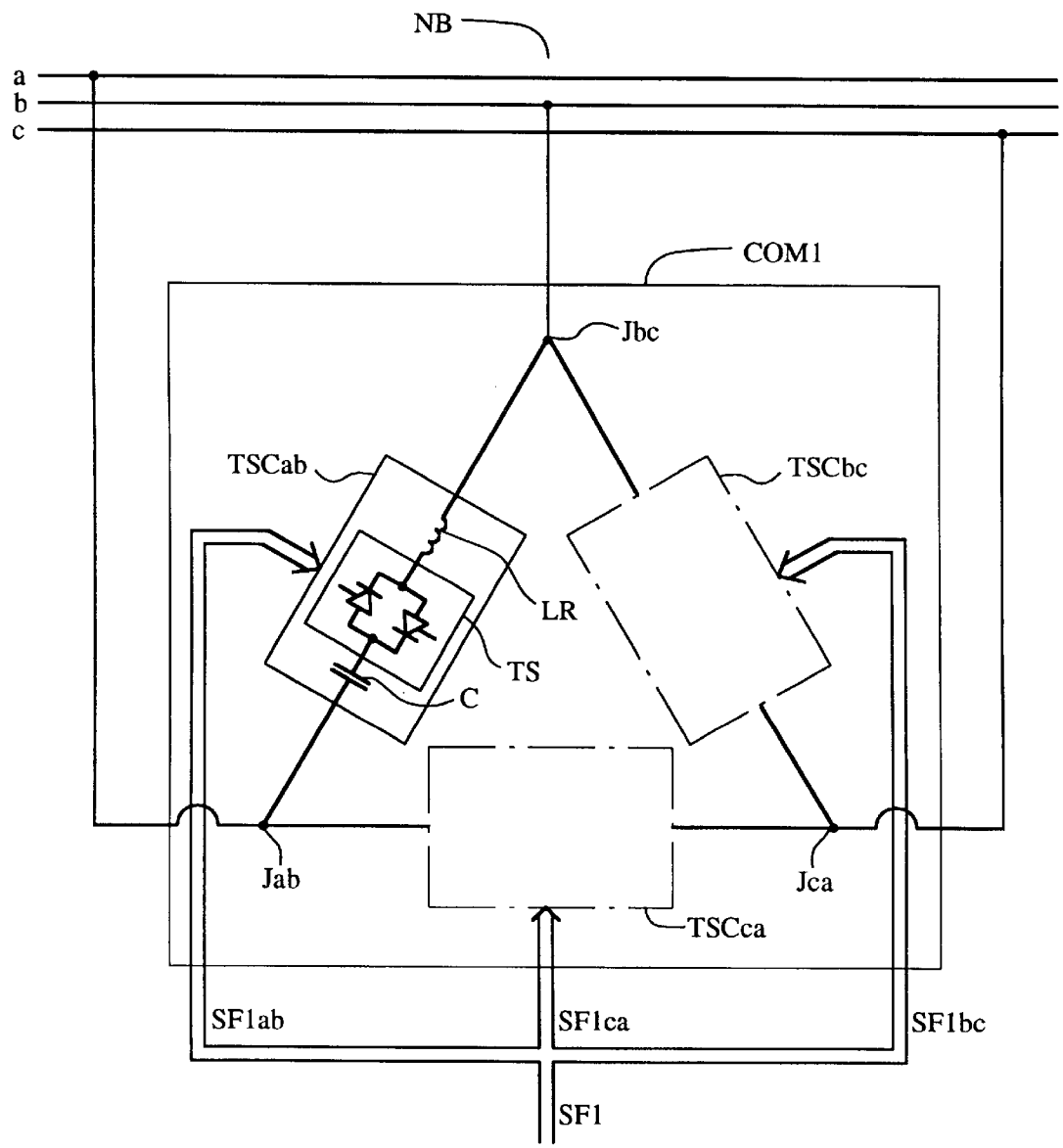
FIG. 2 shows a three-phase diagram of a compensator unit comprised in a compensator according to FIG. 1.

FIG. 2 shows a three-phase diagram of the compensator unit COM1. The compensator unit comprises three mutually Δ-connected capacitor devices TSCab, TSCbc, TSCca, respectively, each one comprising, in series connection, a capacitor C, a semiconductor valve TS and a reactor LR.

The capacitor device TSCab is connected between two connection points Jab and Jbc, the capacitor device TSCca is connected between the connection point Jab and a connection point Jca, and the capacitor device TSCbc is connected between the connection points Jbc and Jca. The connection points Jab, Jbc, Jca are, in their turn, connected to the phases a, b, c, respectively, on the busbar NB. The voltages between the connection points Jab, Jbc and Jca are designated Uab, Ubc and Uca, respectively.

The signal flow SF1 between the compensator unit COM1 and the control device CD1, as illustrated in the figure, comprises three part-signal flows SF1*ab*, SF1*bc* and SF1*ca* between the capacitor devices TSCab, TSCbc, TSCca and the control units CUab, CUbc, CUca comprised in the control device CD1 and belonging to the respective capacitor device.

Figure 3:
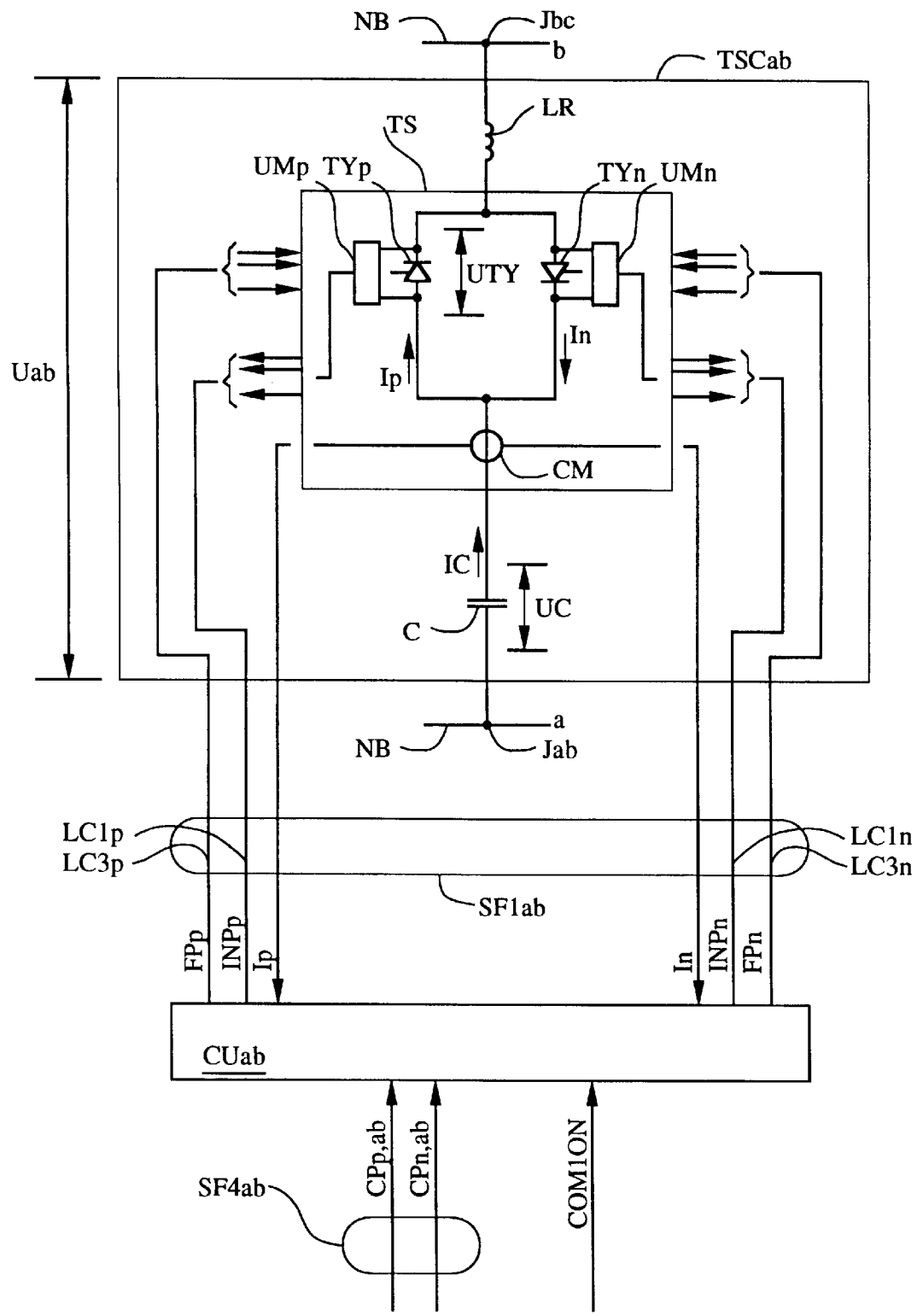
FIG. 3 shows a capacitor device comprised in a compensator unit according to FIG. 2.

FIG. 3 shows the capacitor device TSCab, the part-signal flow SF1*a* between the capacitor device and the control unit CUab, a part-signal flow SF4*ab* from the firing signal device FSD to the control unit CUab and a signal COM1ON, comprised in the signal flow SF7 from the voltage control device VREG to the control unit. In this figure, for the sake of simplicity, the indexes 1 and a and b, respectively, on the signals comprised in the part-signal flow SF1*ab* have been omitted.

The semiconductor valve TS comprises two semiconductors TYp, TYn in antiparallel connection, each one shown as a thyristor in the figure, the semiconductor TYp having its conduction direction from the phase a to the phase b on the busbar NB. The principal voltage Uab is applied across the capacitor device. The voltage across the capacitor C is designated UC and the voltage across the semiconductors is designated UTY. Indicating devices UMp, UMn generate, in some manner known per se, indicating signals INPp and INPn, indicating that an off-state voltage is applied across the semiconductor TYp and the semiconductor TYn, respectively, in their respective conduction direction. Although not shown in the figure, for the sake of clarity, each of the semiconductors comprises a plurality of mutually series-connected thyristors and an indicating signal is generated and supplied for each of the thyristors, which is marked in the figure by a plurality of arrows with the common designation INPn, INPp, respectively. Typically, an indicating signal is generated when the off-state voltage amounts to about 50 V across a thyristor. Likewise, in some manner known per se, the semiconductor valve receives firing signals FPp and FPn, respectively, for the thyristors included in the semiconductors TYp and TYn. Also the firing signals are marked in the figure with a plurality of arrows with the common designation FPn, FPp, respectively, indicating that firing signals are supplied to each of the thyristors included in the semiconductor. A current-sensing member CM is adapted, in some manner known per se, to sense the current IC which flows through the capacitor and to supply a current measurement value of the positive half-cycles of this current, that is, of the current Ip which flows through the semiconductor TYp, and a current measurement value of the negative half-cycles of the current IC, that is, of the current In which flows through the semiconductor TYn. As marked in the figure, the part-signal flow SF1*ab* comprises the mentioned indicating signals, firing pulses and current measurement values.

The voltage control device VREG (FIG. 4) forms, in some manner known per se, in dependence on supplied measured values of the principal voltages U'ab, U'bc and U'ca in the power network NW, switching-in orders COM1ON, COM2ON, COM3ON for switching in the respective compensator unit COM1, COM2, COM3. The three switching-in orders mentioned are comprised in the signal flow SF7.

The firing signal device FSD (FIG. 4) comprises, for each of the principal voltages Uab, Ubc and Uca, a phase-locked loop PLLab, PLLbc and PLLca, respectively, which, in dependence on the supplied measured values of these principal voltages, in some manner known per se, forms corresponding sinusoidal fundamental signals SUab, SUbc and SUca, corresponding to the respective fundamental tone in the supplied measured values and phase-locked 90 electrical degrees before these measured values. The firing signal device generates for the fundamental signal SUab, in some manner known per se, two conduction orders CPp,ab and CPn,ab, respectively, which are mutually complementary in such a way that the conduction order CPp,ab occurs when the fundamental signal SUab is greater than zero and the conduction order CPn,ab occurs when the mentioned fundamental signal is smaller than zero. This implies that the conduction order CPp,ab occurs when the time rate of change of the fundamental component Uab1 in the principal voltage Uab, that is, the voltage across the capacitor device TSCab, is greater than zero, (dUab1/dt)>0, and the conduction order CPn,ab occurs when this time rate of change is smaller than zero, (dUab1/dt)<0.

Figure 4:
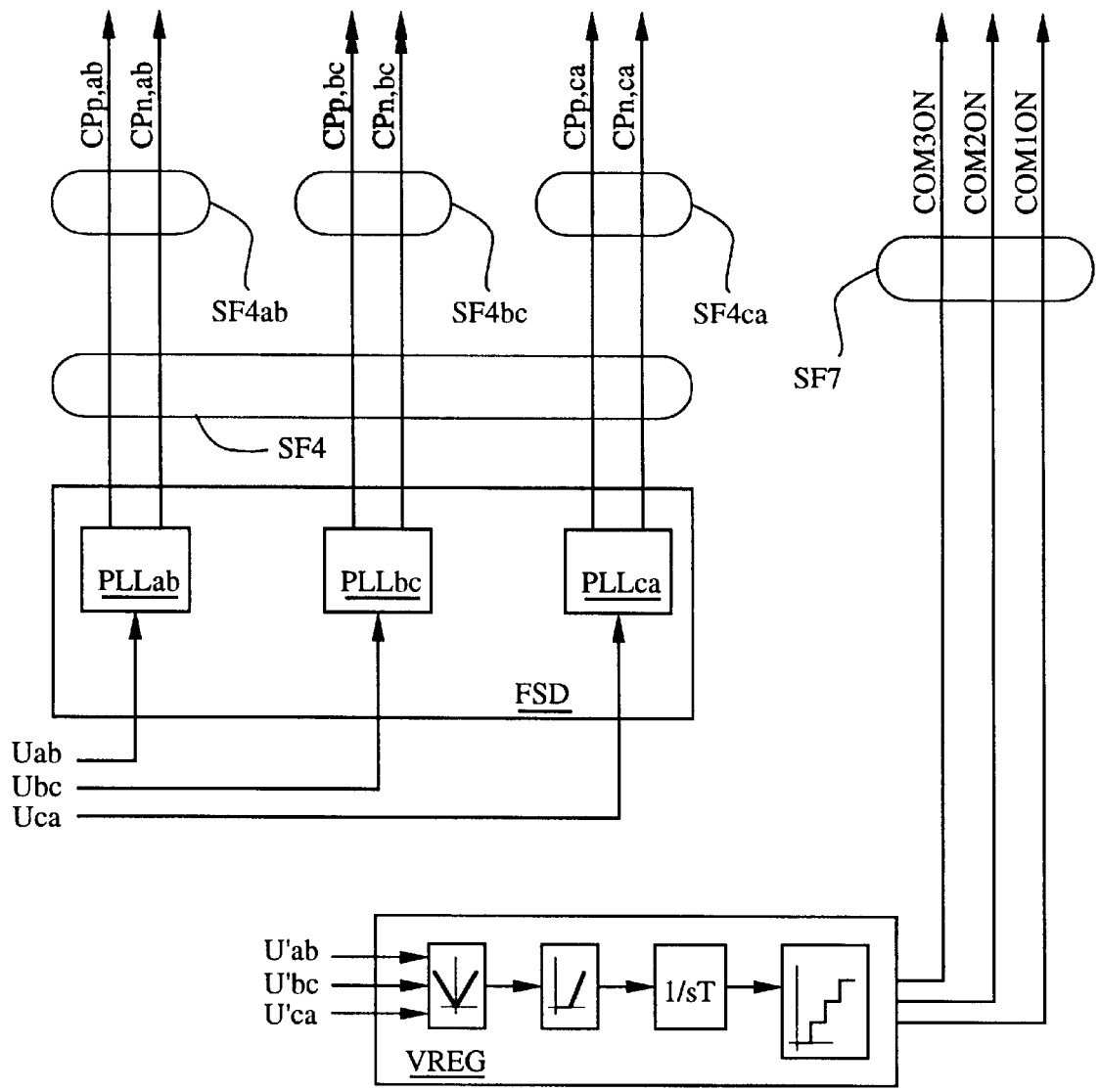
FIG. 4 shows a known embodiment of part of control equipment for a compensator according to FIG. 1.

As illustrated in FIGS. 3 and 4, the signal flow SF4 comprises part-signal flows SF4*ab*, SF4*bc* and SF4*ca*, where the part-signal flow SF4*ab* comprises the above-described conduction orders CPp,ab and CPn,ab, and the part-signal flows SF4*bc* and SF4*ca* comprise corresponding conduction orders CPp,bc, CPn,bc, CPp,ca and CPn,ca, generated in a similar manner in dependence on the fundamental signal SUbc and on the fundamental signal SUca, respectively. The part-signal flows SF4*bc* and SF4*ca* are supplied to the control units CUbc and CUca for the capacitor devices TSCbc, TSCca, respectively.

Figure 5:
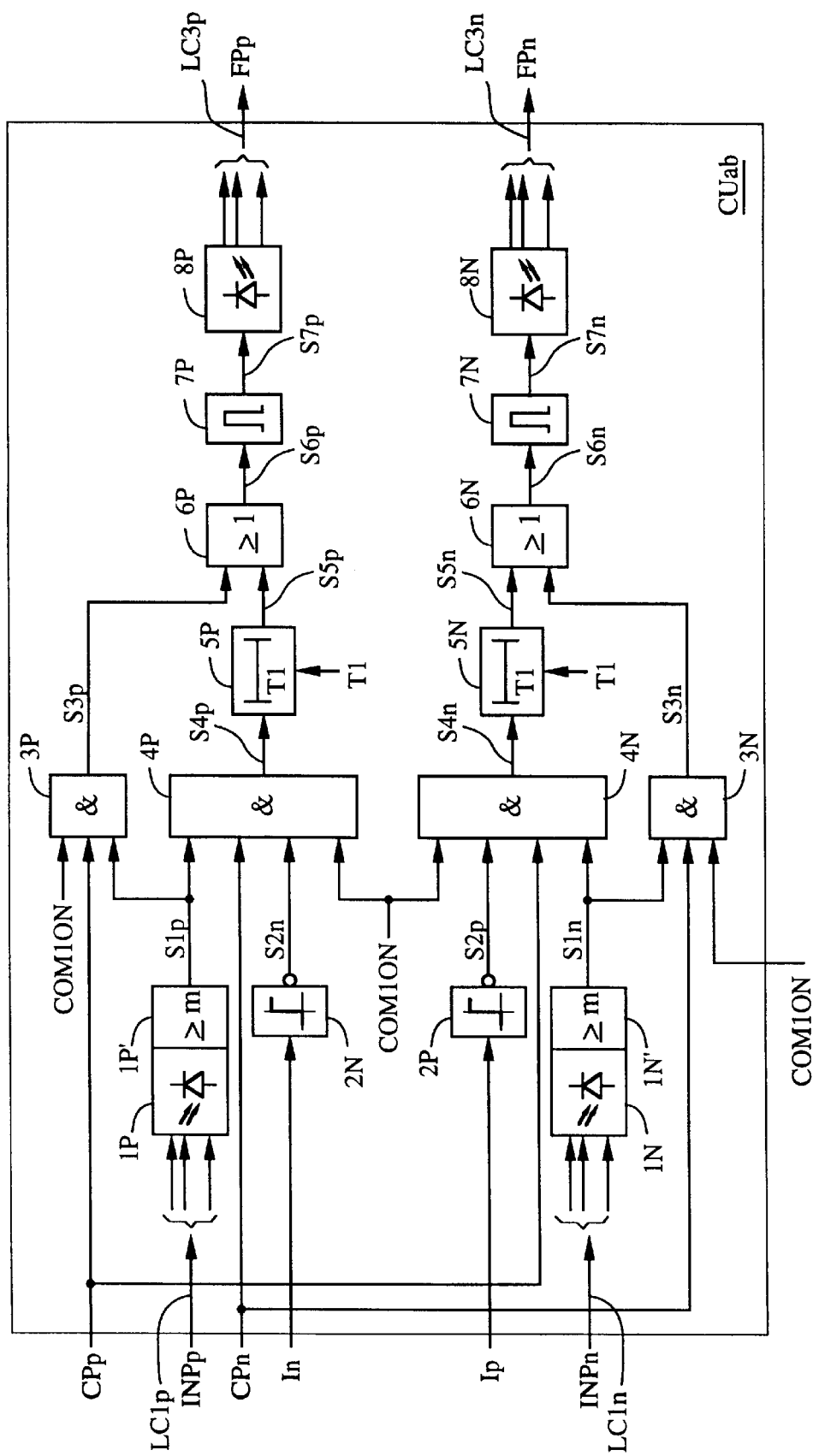
FIG. 5 shows an embodiment of a control unit according to the invention, comprised in control equipment for a compensator according to FIG. 1, and FIGS. 6A and 6B show a number of signal shapes in a control unit according to FIG. 5.

An embodiment of a control unit CUab is shown in the form of a block diagram in FIG. 5. The control units CUbc and CUca are designed in a similar manner, and therefore, in FIG. 5, the index 'ab' on the signals occurring in the figure is not shown.

The indicating signals INPp and INPn are transmitted via light guides LC1p, LC1n, respectively, which are only roughly indicated in the figure, to photodiode circuits 1P, 1N, respectively, comprised in the control device, each one being combined with an individual discriminator circuit 1P', 1N', respectively. The discriminator circuit 1P' supplies a signal S1p when at least one indicating signal INPp is received via the light guide, which implies that at least one thyristor in the semiconductor TYp has taken up an off-state voltage in its forward direction. Analogously, the discriminator circuit 1N' supplies a signal S1n when at least one thyristor in the semiconductor TYn has taken up an off-state voltage in its forward direction. For the purpose of achieving increased safety, the discriminator circuits, as marked in the figure, may be designed to supply their respective signals S1p, S1n when at least a prescribed number 'm' of indicating signals have been received, indicating that the corresponding number of thyristors have taken up off-state voltage.

The current measurement values of the currents Ip and In are supplied to level-sensing members 2P, 2N, respectively, comprised in the control device and having inverted outputs. The level-sensing member 2P forms an output signal S2p when its supplied signal indicates that no current flows through the semiconductor TYp and the level-sensing member 2N forms an output signal S2n when its supplied signal indicates that no current flows through the semiconductor TYn. Typically, the output signals S2p and S2n are formed when the value of the respective current is lower than about 1% of the nominal root-mean square (rms) value of the current.

An AND circuit 3P is supplied with the switching-in order COM1ON, the conduction order CPp and the signal S1p and, when all these signals occur simultaneously, forms an output signal S3p. An AND circuit 3N is supplied in a corresponding manner with the switching-in order COM1ON, the conduction order CPn and the signal S1n and, when all these signals occur simultaneously, forms an output signal S3n.

An AND circuit 4P is supplied with the switching-in order COM1ON, the conduction order CPn, the signal S1p and the signal S2n and, when all these signals occur simultaneously, forms as output signal a deblocking signal S4p.

An AND circuit 4N is supplied with the switching-in order COM1ON, the conduction order CPp, the signal S1n and the signal S2p and, when all these signals occur simultaneously, forms as output signal a deblocking signal S4n.

According to the invention, the deblocking signals S4p and S4n are each supplied to a time-delay member 5P, 5N, respectively, with an optional time delay T1. The output signal S5p from the time-delay member 5P, which thus is delayed by the time T1 in relation to the deblocking signal S4p, and the signal S3p are supplied to an OR circuit 6P, which as output signal forms a firing order S6p when at least one of these input signals occurs.

The output signal S5n from the time-delay member 5N, which is thus delayed by the time T1 in relation to the deblocking signal S4n, is supplied to an OR circuit 6N, which as output signal forms a firing order S6n when at least one of these input signals occurs.

The firing orders S6p and S6n are each supplied to a pulse-shaping device 7P, 7N, respectively, which form pulse-shaped output signals S7p, S7n, respectively. These output signals S7p, S7n are supplied to optocouplers 8P, 8N, respectively, which as output signals form firing signals FPp and FPn, respectively, which via light guides LC3p and LC3n are supplied to the semiconductor valve TS. The semiconductor valve comprises members, not shown in FIG. 3, which in some manner known per se, thus in dependence on the firing orders S6p and S6n, form firing pulses to thyristors comprised in the respective semiconductor.

The mode of operation of the control device will be explained in greater detail with reference to the diagrams in FIGS. 6A–6B, in which the horizontal axis in all cases indicates electrical degrees for the quantities shown on the vertical axis. The description refers to the capacitor device TSCab, as shown in FIG. 4, and to the control unit CUab, as shown in FIG. 5. The other capacitor and control units are built up in a similar way.

Figure 6A:
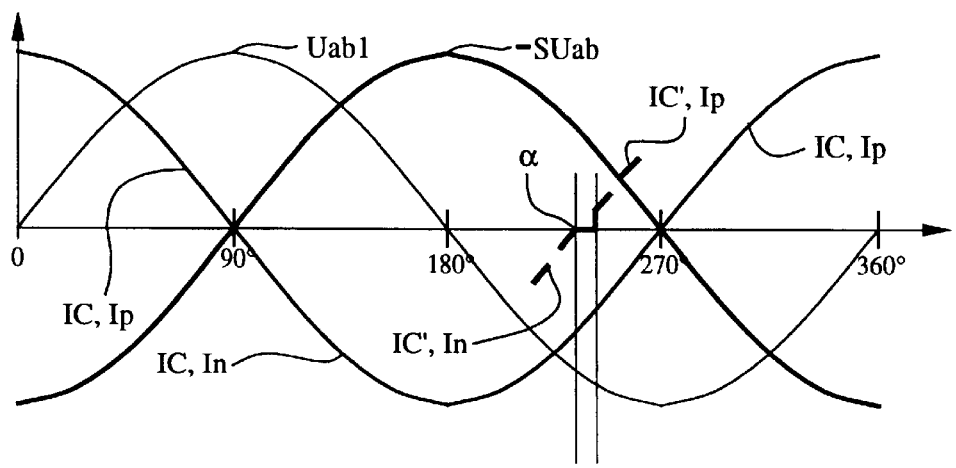

FIG. 6a shows on the vertical axis the fundamental signal SUab, shown with reversed polarity for the sake of clarity. As is clear from the above, the fundamental signal SUab corresponds to the time rate of change of the fundamental component of the voltage Uab on the busbar NB, and hence to the time rate of change of the corresponding component of the voltage across the capacitor device. On the vertical axis there is also shown, in unbroken line, the current IC through the capacitor C in the capacitor device TSCab during undisturbed operation with a switched-in capacitor unit. The designation Ip close to the designation IC marks that it is the semiconductor TYp which carries the current IC, and the designation In marks that it is the semiconductor In which carries the current IC. By way of comparison, also the fundamental component Uab1 of the voltage Uab across the capacitor device is shown on the vertical axis. During undisturbed operation, the zero crossings of the fundamental signal and of the current essentially coincide with each other.

A broken line indicates a current IC' through the capacitor which, for example as a consequence of a fault in the power network, has been caused to a phase position such that its zero crossing from a negative value occurs at an angle α°, shown in the figure in the interval 180°–270°, and hence before the corresponding zero crossing of the fundamental signal at 270°. It is to be noted that the fundamental component Uab1 of the voltage Uab across the capacitor device, shown in the figure, applies to undisturbed operation and not to the case which corresponds to the shown phase position of the current IC'.

Figure 6B:
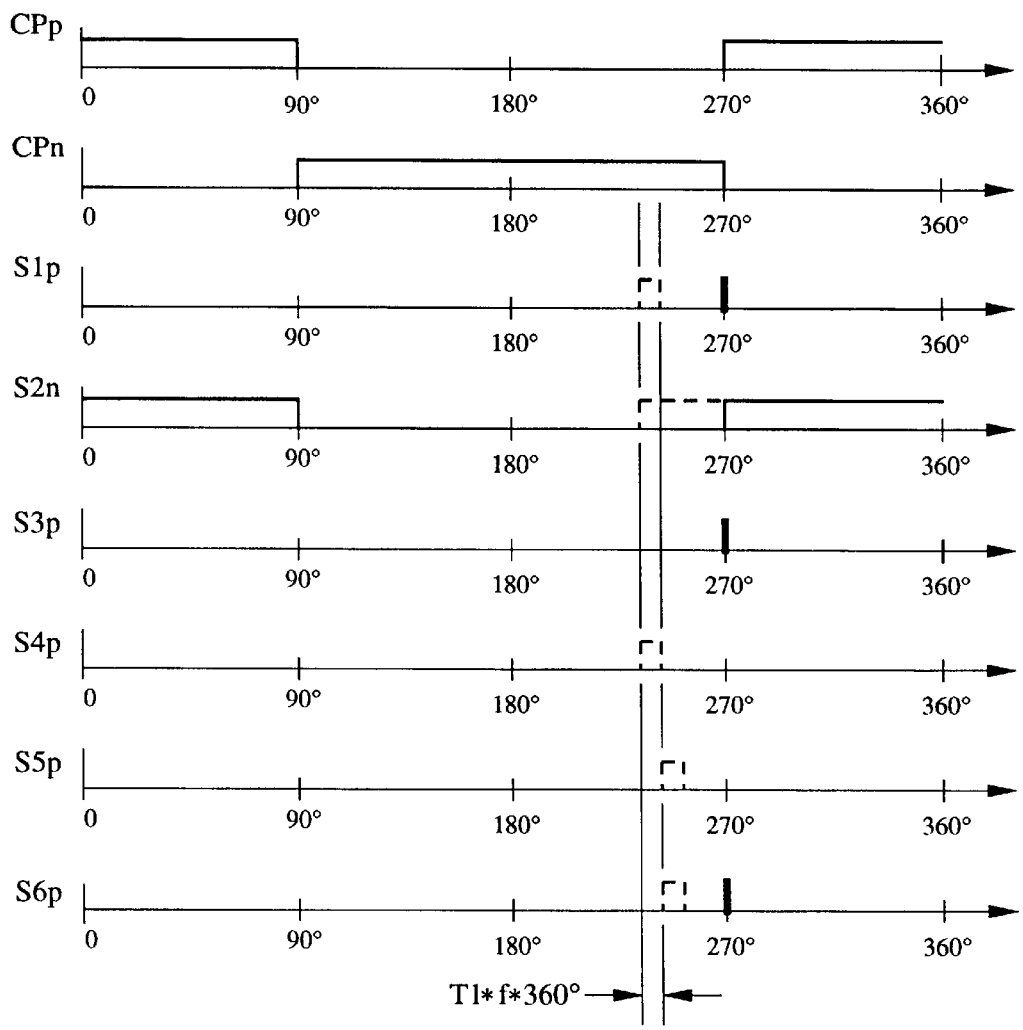

FIG. 6B shows, sequentially from the top and downwards on the respective axes, the conduction orders CPp and CPn, formed in dependence on the fundamental signal, the signals S1p, S2n, S3p, the deblocking signal S4p, the signal S5p and the firing order S6p.

The signals shown in FIG. 6B are shown in unbroken lines for the case of undisturbed operation with a switched-in compensator unit, and in broken lines for the case where the current through the capacitor has the phase position which the current IC' according to FIG. 6B has.

The figures show that the conduction order CPp occurs when the fundamental signal SUab>0 and that the conduction order CPn occurs when the fundamental signal SUab<0.

During undisturbed operation and with a harmonic-free voltage Uab across the capacitor device, the time rate of change (dUab/dt) of this voltage changes signs from a negative sign to a positive sign at the angle 270°, whereby, during the following interval 270°–450°, the conduction order CPn does not occur whereas the conduction order CPp will occur. The current In through the semiconductor valve approaches zero at the angle 270° but ceases at this angle because the semiconductor TYn does not carry current in the opposite direction. The thyristors comprised in the semiconductor TYp have, during the preceding interval 90°–270°, been in a non-conducting state and will, at the angle 270°, take up a voltage in its forward direction. This leads to the formation of the signal S1p, whereby all the input signals on the AND circuit 3P occur, the signal S3p is formed and, consequently, the firing signal FPp. The deblocking signal S4p from the AND circuit 4P is not formed because the conduction order CPn does not occur at this time.

In the event that the current through the capacitor for example has the phase position shown for the current IC' in FIG. 6A, the current In approaches zero at the angle α. The signal S3p does not occur at this angle since the conduction order CPp does not occur.

In one embodiment of the invention, the AND circuit 4P is assumed to comprise only inputs for the signals S1p, CPn and COM1N, so the level-sensing member 2N may be excluded from the control unit CU.

At the angle α, the signal S1p is formed for the same reason as described above. Since in this interval, the conduction order CPn occurs, the deblocking signal S4p is formed at the angle α, and, delayed by the time T1, the signal S5p and, as a result, the firing signal FPp. The signal S1p disappears when the semiconductor TYp has been set in the conducting state.

As illustrated at the bottom of FIG. 6B, during undisturbed operation the firing order S6p and hence the firing signal FPp are formed, at the zero crossing of the current at the angle 270° in dependence on the signal S3p. In case of an operational disturbance, which results in the zero crossing of the current In occurring at an angle α which is before the angle 270°, the firing order S6p is formed in dependence on the signal S5p, and hence in dependence on the deblocking signal S4p. The firing order occurs at an angle T1*f*360° after the current In has approached zero from a negative value, where f is the frequency of the electric power network NW.

In another embodiment of the invention, the control unit CU comprises the level-sensing member 2N and the AND circuit 4P also an input for the signal S2n. As is clear from FIGS. 5 and 6B, the signal S2n is formed as the current approaches zero, that is, essentially simultaneously (in practice, somewhat earlier, depending on setting levels in indicating devices UMp, UMn and the level-sensing members 2P, 2N, respectively) as the signal S1p from the discriminator circuit 1P'. The function of the control unit as regards the formation of the deblocking signal S4p and the signal S5p is therefore similar to the one described above. The sensing of the respective current Ip and In through the semiconductor valve and the condition that a deblocking signal is to be formed only if the current has ceased to flow through the semiconductor, however, entails additional safety in the control of the capacitor device and also entails an advantageous improvement of the invention.

The control unit is designed quite symmetrically with respect to the generation of the firing signal FPp and the firing signal FPn, so no description of how the latter firing order is generated will be given.

In summary, thus, the function of the control unit according to the invention is such that, when the current through the semiconductor flows in a first conduction direction of the two conduction directions of the semiconductor valve and approaches zero in an angular interval when the conduction order for this interval with the associated expected conduction direction still exists, but not the conduction order for the second conduction direction, and an indication (signals S1p, S2n, S2p, S1n) that the current thereby ceases to flow through the semiconductor valve, a firing order is generated for the second conduction direction in dependence on a deblocking signal and with an optional delay after the deblocking signal has been generated.

The time delay T1 corresponds to an electrical angle T1*f*360°, where f is the frequency of the electric power network NW. Studies have shown that this angle should advantageously be chosen to lie in the interval 7°–11°, that is, at a frequency of 50 Hz for the power network, corresponding to a time delay in the interval of about 0.4–0.6 ms. In this way, the probability that dangerous overvoltages will build up across the capacitor during this period is greatly reduced while at the same time maintaining a good damping of the transient phenomena after a switching-in when there is a voltage difference between the power network and the capacitor and also of the above-mentioned resonance phenomena when the voltage of the power network contains harmonics.

The invention is not limited to the embodiments shown above. For example, the control units Cuab etc. may be designed in a plurality of ways, known to the person skilled in the art, in dependence on the means by which the functions carried out by the control units are implemented.

The value of the time delay T1 may also, in some manner known to a person skilled in the art, be formed in dependence on, for example, the off-state voltage sensed at the indicating devices UMp, UMn, in such a way that this value is in inverse proportion to the sensed off-state voltage.

I claim:

1. A method for control of a capacitor device (TSCab, TSCbc, TSCca) for a shunt-connected static compensator unit (COM1, COM2, COM3) for compensation of reactive power in an electric power network (NW), the capacitor device comprising a capacitor (C) and a semiconductor valve (TS), connected in series with said capacitor, with a first semiconductor (TYp), corresponding to a first conduction direction (CTYp) for current through the capacitor and a second semiconductor (TYn), corresponding to a second conduction direction (CTYn) for current through the capacitor, wherein
 a voltage (Uab, Ubc, Uca) is sensed at the compensator and a first firing order (S6p) for the first semiconductor and a second firing order (S6n) for the second semiconductor are generated alternately in dependence on the sign of the time rate of change of a value of the fundamental component of this voltage, which value is derived from said sensed voltage
 characterized in that for each one of the first and second conduction directions (CTYp, CTYn), a deblocking signal (S4p, S4n) is formed which indicates that the conduction direction associated with the respective firing order does not carry current, and that
 the firing order is generated for the second (CTYn, CTYp) of the first and second conduction directions with an optional delay (T1*f*360°) after the occurrence of said deblocking signal.

2. A method according to claim 1, characterized in that said time rate of change is formed by means of a phase-locked loop (PLLab, PLLbc, PLLca) as a sinusoidal signal with a phase lag of 90 electrical degrees relative to said sensed voltage.

3. A method according to claim 1, characterized in that the deblocking signal is formed by sensing of an off-state voltage (UTY) across the semiconductor.

4. A method according to claim 1, characterized in that the deblocking signal is formed by sensing of a current (Ip, In) through the semiconductor.

5. A method according to claim 1, characterized in that said optional delay preferably lies in an interval of 7 to 11 electrical degrees.

6. A device for control of a capacitor device (TSCab, TSCbc, TSCca) for a shunt-connected static compensator unit (COM1, COM2, COM3) for compensation of reactive power in an electric power network (NW), the capacitor device comprising a capacitor (C) and a semiconductor valve (TS), connected in series with said capacitor, with a first semiconductor (TYp), corresponding to a first conduction direction (CTYp) for current through the capacitor, and a second semiconductor (TYn), corresponding to a second conduction direction (CTYn) for current through the capacitor, the device comprising members (VN, FSD, CU) which sense a voltage (Uab, Ubc, Uca) at the compensator, which forms a value of the time rate of change of a value of the fundamental component of this voltage, which value is derived from said sensed voltage, and which, in dependence on the sign of this time rate of change, generates a first firing order order (S6p) for the first semiconductor and a second firing order (S6n) for the second semiconductor, characterized in that the device, in addition thereto, comprises members (UMp, UMn, CM, 1P, 1P', 2N, 2P, 1N, 1N', 5P, 5N) which, for each of the first and second conduction directions (CTYp, CTYn), form a deblocking signal (S4p, S4n), indicating that the conduction direction associated with the respective firing order does not carry current, and which generate a firing order for the second (CTYn, CTYp) of the first and second conduction directions with an optional delay (T1*f*360°) after the occurrence of said deblocking signal.

7. A device according to claim 6, characterized in that it comprises a phase-locked loop (PLLab, PLLbc, PLLca) which forms the value of the time rate of change as a sinusoidal signal with a phase lag of 90 electrical degrees relative to said sensed voltage.

8. A device according to claim 6, characterized in that it comprises means (UMp, UMn, 1P, 1P', 1N, 1N') which form said deblocking signal by sensing of an off-state voltage (UTY) across the semiconductor valve.

9. A device according to claim 6, characterized in that it comprises means (CM, 2N, 2P) which form said deblocking signal by sensing of a current (Ip, In) through the semiconductor valve.

10. A device according to claim 6, characterized in that it comprises time-delay members(5P, 5N) for setting of said optional delay, preferably in an interval of 7 to 11 electrical degrees.

* * * * *